July 11, 1950
A. J. PRICKETT
2,514,970
CHUCK FOR WINDING APPARATUS
Filed Nov. 23, 1944
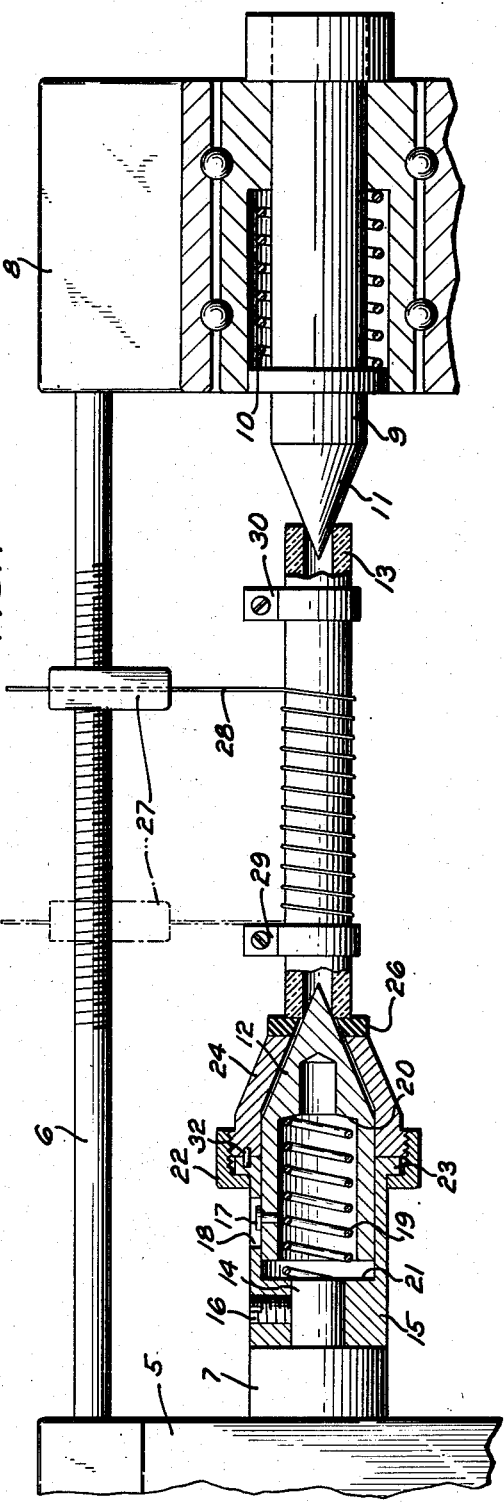
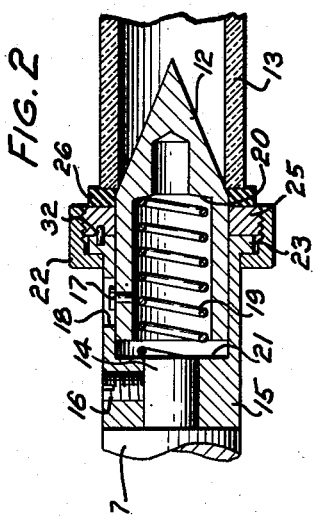
INVENTOR
A. J. PRICKETT
BY Harry L. Duft
ATTORNEY Patented July 11, 1950

2,514,970

UNITED STATES PATENT OFFICE 2,514,970

CHUCK FOR WINDING APPARATUS

Alfred J. Prickett, Des Plaines, Ill., assignor to Western Electric Company, Incorporated, New York, N. Y., a corporation of New York Application November 23, 1944, Serial No. 564,763

7 Claims. (Cl. 242—68)

This invention relates to chucks for winding apparatus and more particularly to a chucking device for holding tubular ceramic members during the application thereto of a winding or serving of wire.

In the winding of resistors on tubular ceramic cores live centers of conical shape with radially extending grooves have been used to center and drive the cores but due to the abrasive quality of the cores the effective life of these tools has been very short since the ridges between the grooves had to cut into the ceramic core an amount sufficient to drive the core and consequently the centers wore out very rapidly.

It is an object of the present invention to provide a simple and efficient winding apparatus.

In accordance with one embodiment of the invention as applied to apparatus for winding a resistance wire on tubular ceramic insulators, a chucking device is provided for supporting the insulators in position to receive the wire from a screw type distributor wherein the insulator is gripped to be rotated by a soft rubber element which surrounds a spring pressed centering device for properly centering the insulator with respect to the driving element of the apparatus and thus causing a positive rotation of the ceramic insulator. The chucking device is provided with a spring pressed conically shaped centering member which enters the central aperture in the tubular ceramic member and may be moved back by the ceramic member whereby an edge of the tubular member will be pressed against the soft rubber drive member or element by a spring pressed centering device mounted on the tail stock of the apparatus.

A complete understanding may be had by reference to the following detailed description when considered in conjunction with the accompanying drawing, wherein Fig. 1 is a fragmentary front elevational view of a winding apparatus embodying the present invention, part being shown in section to more clearly illustrate the construction thereof; and Fig. 2 is a fragmentary sectional view showing an alternate form of driving chuck.

In the drawing, wherein like reference characters designate the same parts in the several views, the apparatus is shown as comprising a head stock 5 in which mechanism (not shown) is mounted to drive a lead screw 6 and a head stock spindle 7. The right end of the lead screw 6 is supported in a tail stock 8 which also supports a spring pressed live center spindle 9 which is freely rotatable in the tail stock 8 and is spring pressed to the left (Fig. 1) by means of a compression spring 10. The spindle 9 is provided with a conically pointed live center 11 adapted to cooperate with a conically shaped live center 12, driven by the head stock spindle 7, in supporting and centering a tubular ceramic core 13. The head stock spindle 7 has a reduced shank 14 to which a sleeve 15 may be attached by means of a set screw 16. The sleeve 15 receives the live center 12 and will serve to drive the live center 12 through the cooperation of a pin 17 fixed to the live center and riding in a slot 18 in the sleeve 15. The live center 12 is normally urged to the right to its operative position by a compression spring 19 interposed between an internal shoulder 20 formed on the live center 12 and an internal shoulder 21 formed in the sleeve 15.

An internally threaded coupling collar 22 is freely rotatable about the sleeve 15 and engages a shoulder 23 formed on the periphery of the sleeve in such manner that either the chuck element 24 (Fig. 1) or a chuck element 25 (Fig. 2) may be fixed to the sleeve 15 in position to encircle the live center 12. Various sizes of chuck elements 24 and 25 may be provided to accommodate different sizes ceramic bases 13 and each of these elements has a relatively soft rubber washer or ring 26 mounted upon its right edge in position to engage the end of a ceramic base 13 held against it by the live center 11 with sufficient force so that rotation may be imparted to the base when the head stock spindle 7 is driven. The rubber ring 26 will thus positively rotate the ceramic base 13 to maintain the proper relation between the base and a distributor driving nut 27 driven by the lead screw 6 for the purpose of distributing a strand of wire 28 on the ceramic base in the manufacture of resistors. The base 13 is provided with a pair of clamping rings 29 and 30 which serve as terminals for the strand of wire 28 after the strand has been wound on the ceramic base 13. In order to insure the positive rotation of the chuck element with the sleeve 15, a locking pin 32 is provided which extends into a suitable aperture in the shoulder 23 and into the face of the chuck element which abuts the shoulder.

A more complete understanding of the invention may be had by reference to the following brief description of the mode of operation of the apparatus in winding a resistor. With the driving nut 27 in its extreme left hand position as indicated by the dot and dash line (Fig. 1) a tubular ceramic insulator core member may be placed between the two live centers 11 and 12 by moving the live center spindle 9 to the right against the action of the spring 10 and resting the left end of the core 13 against the live center 12. Then upon release of the spindle 9 the ceramic core 13 will be centered between the two live centers 11 and 12 ready to receive a winding of resistance wire 28. The resistance wire 28 may be attached to the ring 29 and the apparatus started to perform its winding operation. The rubber ring 26, engaging the left end of the core 13 is the sole driving means between the chuck element 24 and the core, and will positively drive the core during the positive movement of the distributor driving nut 27 to distribute the strand of wire 28 in equally spaced windings along the core 13. After the desired amount of wire 28 has been wound on the core 13, the end of the wire may be attached to the ring 30 and the resistors are then ready for further processing.

Prior to the winding operation, a chuck element 24 or 25 of the proper size as determined by the inside diameter of the tubular ceramic base member must be selected and mounted upon the sleeve 15 in position to encircle a portion of the live center 12. A chuck element should be selected of such size that the live center 12 will be depressed somewhat with respect to the ring 26 so that it will effectively center the base 13 in the apparatus prior to the engagement of the left end of the base with the ring 26. Various sizes of chuck elements 24 and 25 may be provided, ranging from the plain ring 25 as shown in Fig. 2 to a shape as illustrated in Fig. 1 by the chuck element 24 which comprises the straight threaded annulus formed integrally with a frusto-conical portion for supporting the ring 26 of relatively small size.

What is claimed is:

1. In a winding apparatus, means for rotating a core comprising a positively driven rotatable sleeve, a centering device mounted within the sleeve for reciprocation along the axis of the sleeve, elastic means within said sleeve engaging opposed surfaces of said sleeve and device for normally urging said device to an operative position, and chucking means fixed to the sleeve and having a soft rubber core engaging ring at its free end effective to serve as the sole driving means between said sleeve and core for driving the core.

2. In a winding apparatus, means for rotating a core comprising, a positively driven rotatable sleeve, a hollow centering device mounted within the sleeve for movement along the axis of the sleeve, elastic means within said device engaging opposed surfaces of said sleeve and device for normally urging said device to an operative position, and an annular chucking means fixed to said sleeve and having a soft rubber ring at its free end encircling the centering member to engage the end of a centered core effective to serve as the sole driving means between said sleeve and core for driving it.

3. A chucking device for use in supporting and rotating tubular ceramic cores during the application thereto of servings comprising a positively driven hollow rotatable member, centering means mounted within and on the axis of rotation of said member for engaging and centering a core with respect to the positively driven member, elastic means within said member engaging opposed surfaces of said member and centering means for normally urging said centering means to an operative position, and an annular member fixed to said positively driven member in a position encircling a portion of the centering means to engage and effective to serve as the sole driving means between said member and core for driving it.

4. A chucking device for use in supporting and rotating tubular ceramic cores during the application thereto of servings comprising a positively driven hollow rotatable member, centering means mounted within and on the axis of rotation of said member for engaging and centering a core with respect to the positively driven member, elastic means within said member engaging opposed surfaces of said member and centering means for normally urging said centering means to an operative position, and an annular soft rubber ring fixed to the free end of said positively driven member in position to encircle a part of the centering means for engaging and effective to serve as the sole driving means between said member and core for driving it.

5. In an article forming apparatus, a driven sleeve, a conically tipped live center mounted within and rotatable with said sleeve for movement to a predetermined position axially of said sleeve, a coiled compression spring with said sleeve engaging opposed surfaces of said sleeve and live center for normally urging said live center to an operative position, a chucking member encircling a portion of said live center and connected to said sleeve, and an annular ring of relatively soft rubber on the free end of the chucking member for engaging and gripping the end of a core centered by said live center effective to serve as the sole driving means between said sleeve and core to drive the core.

6. In an article forming apparatus, a chucking device for use in supporting and rotating ceramic cores comprising a positively driven hollow rotatable member, centering means mounted within and on the axis of rotation of said member for engaging and centering a core with respect to the positively driven member, elastic means within said member engaging opposed surfaces of said member and centering means for normally urging said centering means to an operative position, and an annular member fixed to said positively driven member in a position encircling a portion of the centering means to engage and effective to serve as the sole driving means between said member and core to drive it.

7. In an article forming apparatus, a rotatable sleeve, a conically tipped live center rotatable with said sleeve and resiliently urged to a predetermined position axially of said sleeve, a coupling member encircling said sleeve and having an internally threaded portion, a chucking member encircling a portion of said live center and connectable to said sleeve by the threaded coupling member, and an annular ring of relatively soft rubber on the free end of the chucking member for engaging and gripping the end of a core centered by said live center to drive the core.

ALFRED J. PRICKETT.

REFERENCES CITED

The following references are of record in the file of this patent:

UNITED STATES PATENTS

| Number | Name | Date |
|---|---|---|
| 903,999 | Milne | Nov. 17, 1908 |
| 1,149,224 | Sill | Aug. 10, 1915 |
| 1,336,548 | Amundsen | Apr. 13, 1920 |
| 1,627,188 | Lightfoot | May 3, 1927 |
| 1,912,987 | Lovely | June 6, 1933 |